*INVENTOR.*
ROBERT C. CLARK
BY
[signature]
ATTY.

United States Patent Office 3,515,807
Patented June 2, 1970

3,515,807
CONFERENCE ARRANGEMENT HAVING A PLURALITY OF TRANSMISSION MODES

Robert C. Clark, Broadview, Ill., assignor to Automatic Electric Laboratories, Inc., Northlake, Ill., a corporation of Delaware Filed May 5, 1966, Ser. No. 547,851
Int. Cl. H04m 3/56
U.S. Cl. 179—18 1 Claim

ABSTRACT OF THE DISCLOSURE

A conference bridge circuit has a full duplex mode which permits parties at all connected stations to talk to one another, and a restricted duplex mode which permits the commander at a main control station to talk to all other stations, and parties at other stations to talk only to the commander, not to each other. A key at the control station controls a signal generator to send signals to operate mode changing apparatus in the bridge circuit. The control station also has keys to control "no talk back" apparatus.

This invention relates generally to communication apparatus and more particularly to arrangements for changing the operating transmission modes in an established conference connection.

The primary reason for providing conference facilities is to allow several parties to exchange information of common interest at the same time. If each conferee is to be heard by every other conferee, the conference arrangement must provide full duplex service.

Restricted duplex service is required for conference connections in which a conferee of authority chairs the conference. This service permits duplex transmission between the chairman and the other conferees and prevents conversation between the individual conferees.

There are also times when a person of authority does not wish to be interrupted in the delivery of an important message or a directive to the several conferees. For such occasions, the transmission facilities must provide one-way transmission from the chairman to the other conferees in addition to preventing conversation between the other conferees.

Since one who is commanding a conference has occasion to employ all three of the above transmission modes during a single conference, it is the primary object of the invention to provide new and improved conference techniques whereby the above modes of transmission are available for each conference and may be selectively provided at the will of the commanding conferee.

Accordingly, a feature of the present invention resides in the provision of apparatus for changing the transmission mode of a full duplex conference bridge in response to the receipt of coded signals from a commanding station. An attendant feature resides in the provision of multifrequency transmitting and receiving equipment since, in a telephone-type conference, it is most advantageous to derive these coded signals in the voice band from a multifrequency calling device which includes a pushbutton dial or keyset.

Another feature of the invention resides in the provision of means to disconnect the receiving side of the control station from a communication system to permit one-way only transmission.

Figure 1:
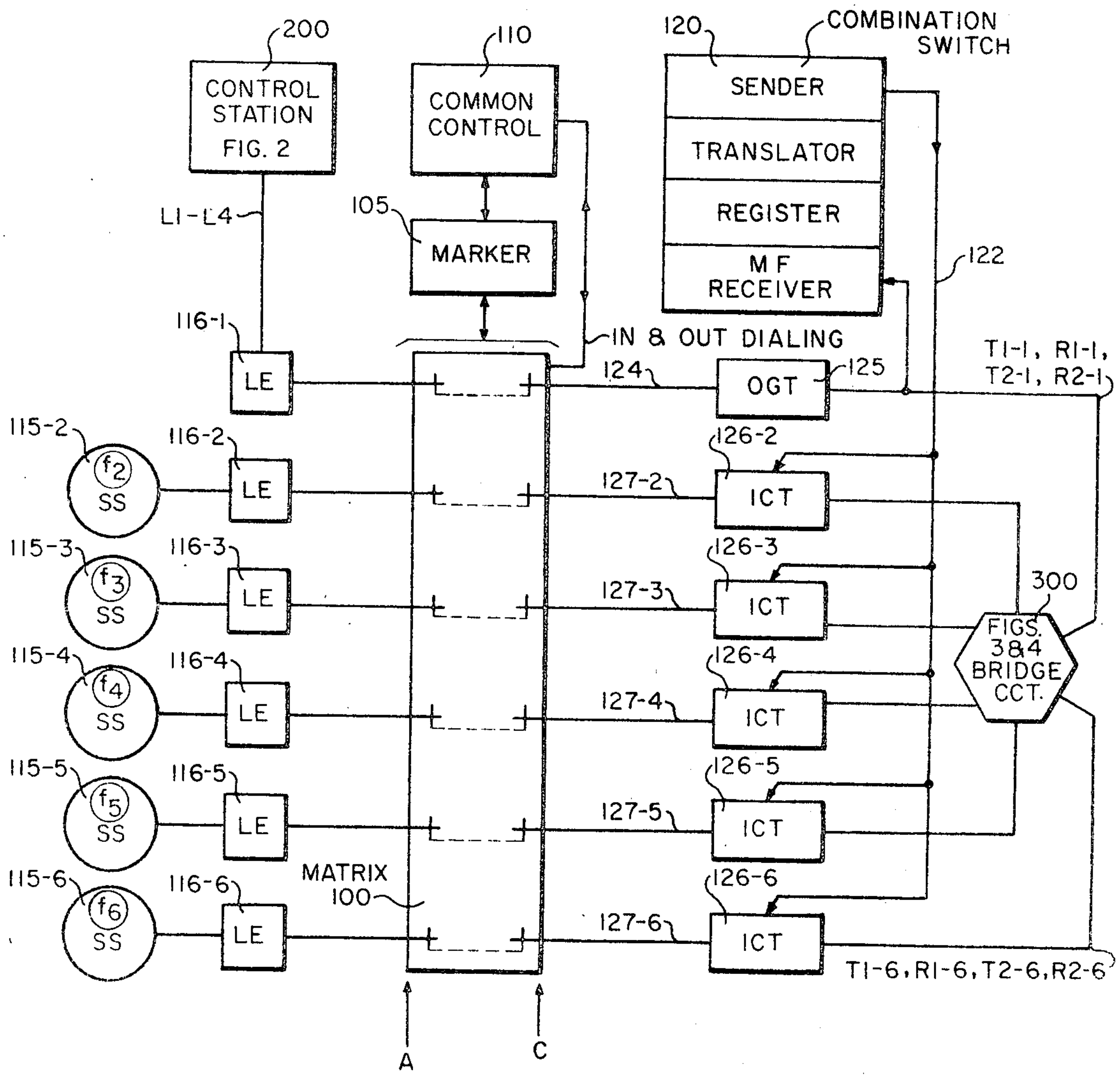
Figure 5:
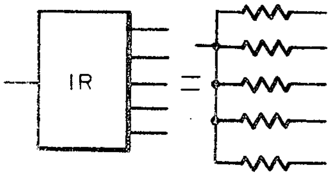
Figure 2:
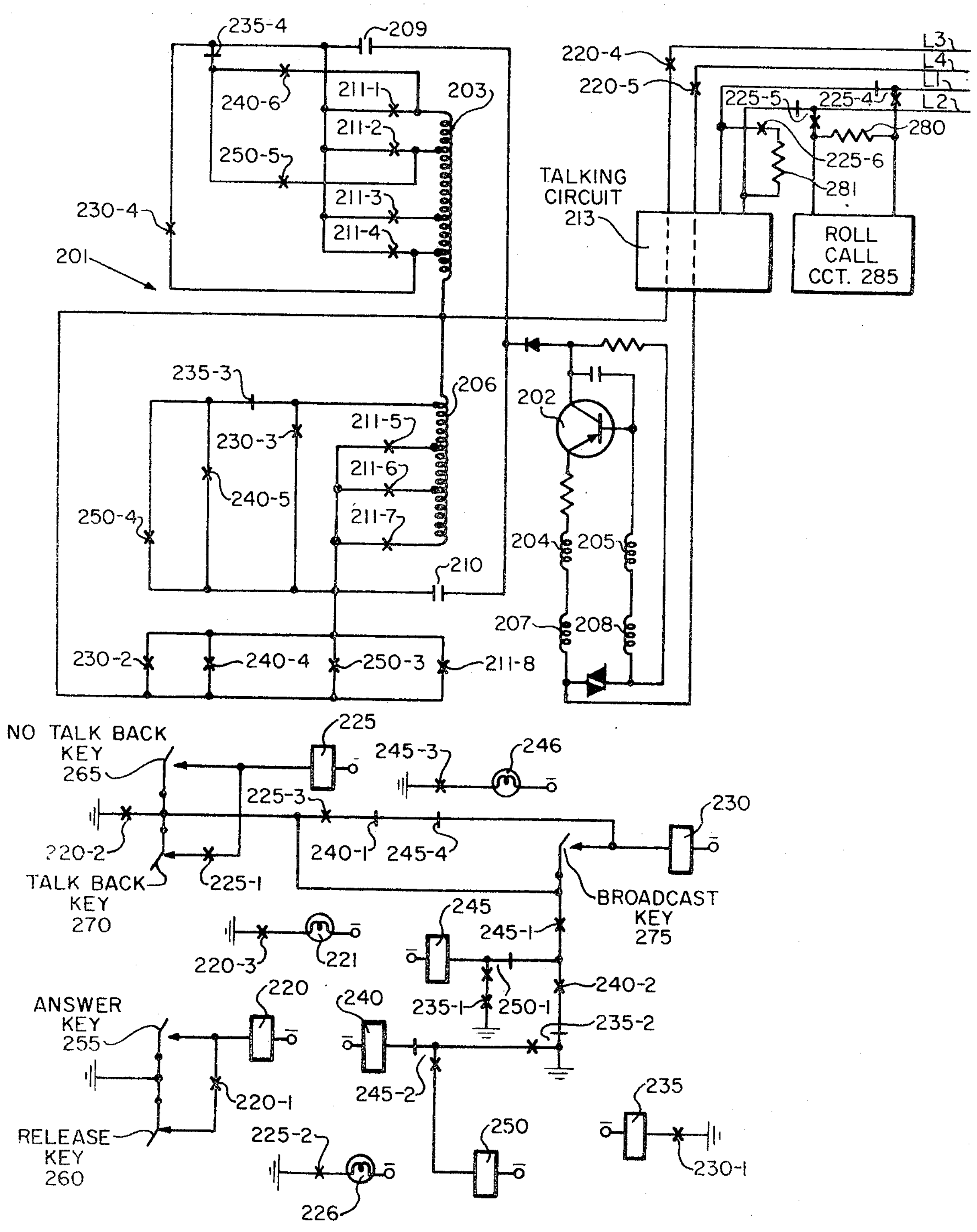
Figure 3:
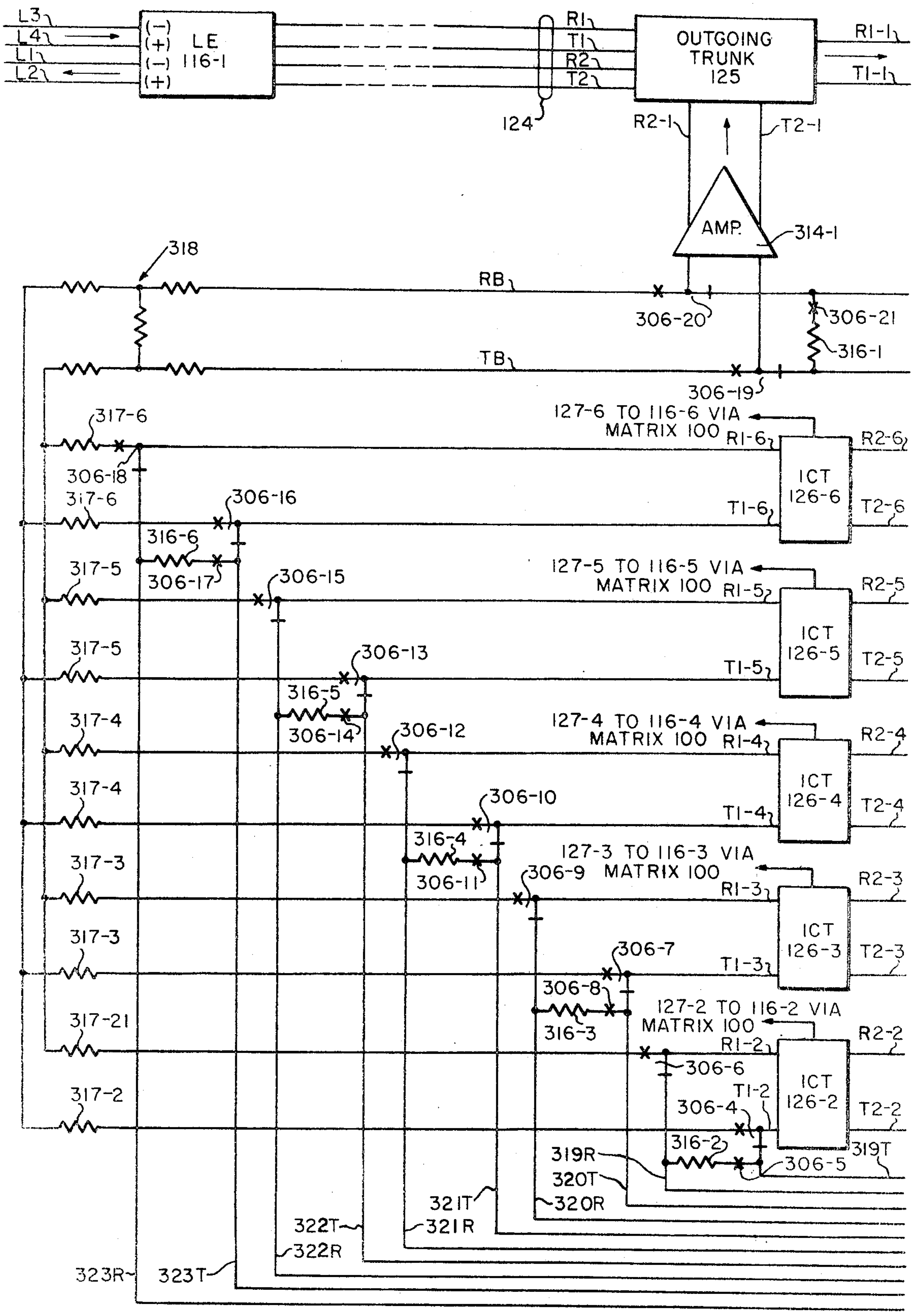
Figure 4:
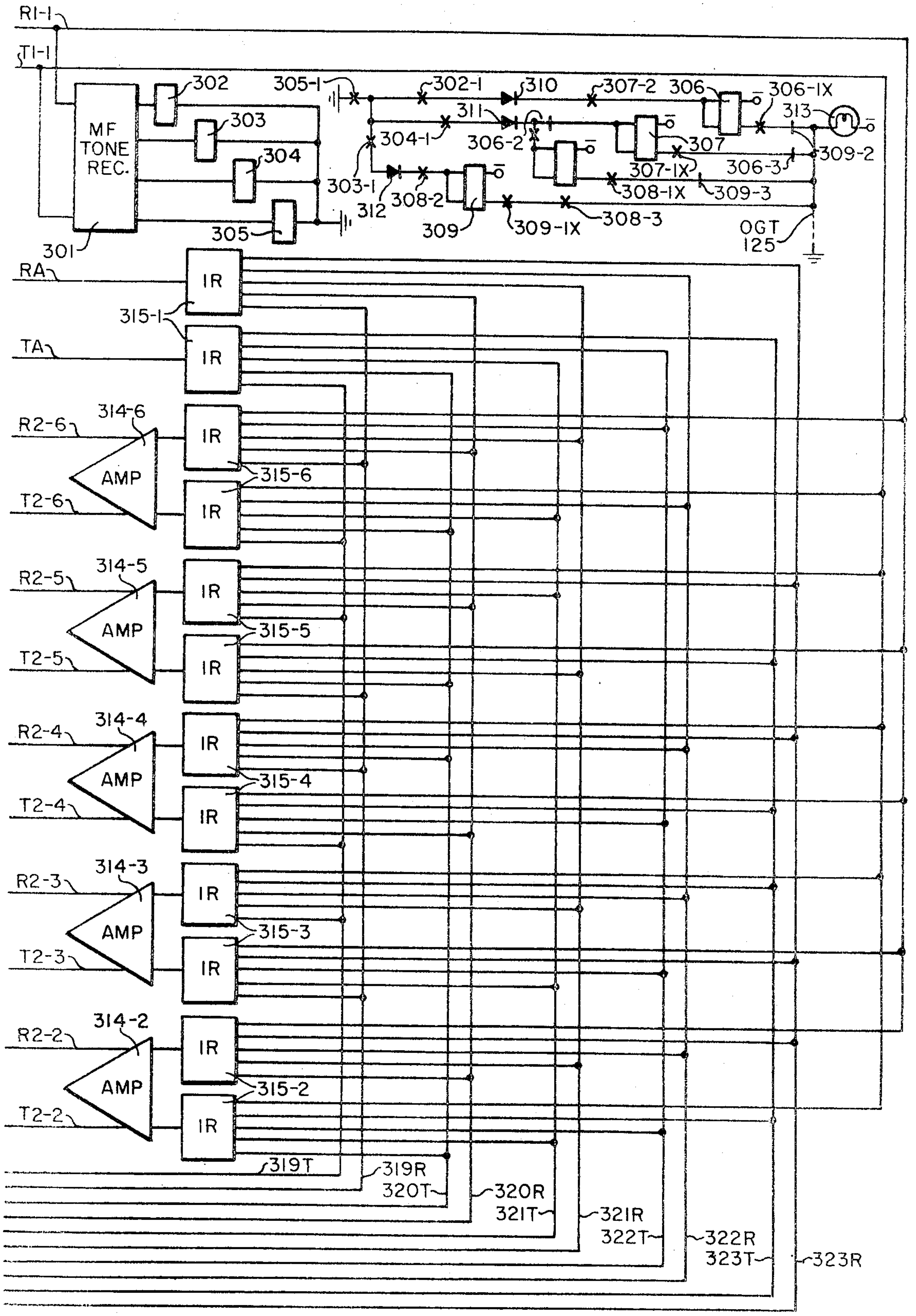

Other objects and features of the invention will become apparent, and the invention will be best understood from the following description taken in conjunction with the accompanying drawings, in which:

FIG. 1 is a block diagram representation of a switching system showing an environment for the present invention;

FIGS. 2, 3, and 4 together form a schematic representation of an embodiment of the invention;

FIG. 5 is a circuit diagram of a portion of FIG. 4; and

Figure 6:
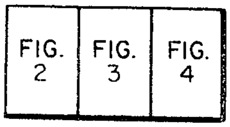

FIG. 6 describes the proper orientation of FIGS. 2, 3 and 4.

General description

R. J. Murphy et al. in their U.S. patent application Communication Switching System, Ser. No. 450,275, filed Apr. 23. 1965, now Pat. No. 3,328,534, as a continuation-in-part of their U.S. patent application Ser. No. 367,797, filed May 15, 1964 describe a communication switching system of the common control type which employs marker-controlled coordinate matrix switching networks. This same type of system is described in FIG. 1 of the present drawings in which the switching machine comprises a coordinate matrix 100, a marker 105 and a common control equipment 110. Connected to the matrix and control equipment are outgoing trunk OGT, further referenced 125, and incoming trunks ICT, further referenced 126–2 to 126–6. Connected to the trunk circuits is combination switch 120 and bridge circuit 300. The outgoing trunk is connected to a four-conductor main terminal T1–1, R1–1, T2–1, R2–1, and each incoming trunk is connected to a four-conductor subordinate terminal of the bridge, such as T1–6, R1–6, T2–6, R2–6. Control station 200, the command station, and the subordinate stations SS, further referenced 115–2 to 115–6, are respectively connected to the matrix by way of the 4-wire line equipment LE, further referenced 116–1 to 116–6. It should be noted that the line equipment and the incoming trunks each have an appearance on the A side of the matrix and on the C side of the matrix. These connections are not shown in order to simplify the drawings.

FIGS. 2–6 show an embodiment of the invention in which the commander's console or control station 200 and the bridge circuit 300 are shown in more detail. In FIG. 2, control station 200 comprises calling device 201, control relays 230, 235, 240, 245, and 250 for use in conjunction with the calling device, talking circuit 213, roll call circuit 285, answer (hookswitch) relay 220, relay 225 for controlling the no-talkback (NTB) mode of operation, and non-locking keys 255, 260, 265, 270 and 275 for controlling the transmission modes. Lamps 221, 226 and 246 indicate the operation mode of the conference connection.

FIGS. 3, 4 and 5 illustrate the bridge circuit 300 and its conference arrangement. Conductors R1–1, T1–1 to R1–6, T1–6 serve as inputs to the bridge circuit from the outgoing trunk 125 and the incoming trunks 126. In a normal full duplex connection, the just-mentioned bridge inputs are connected via conductors 319R, 319T to 323R, 323T to the input resistance circuits IR, further referenced 315–1 to 315–6, of the output amplifiers 314–1 to 314–6. A detailed example of an input resistance circuit IR is shown in FIG. 5. Conductors R2–1, T2–1 to R2–6, T2–6 serve to connect the output amplifiers back to the trunk circuits. The MF tone receiver 301 and relays 302 to 309 serve as mode changing apparatus for the bridge circuit, while resistances 316 to 318 provide the proper circuit coupling and terminating impedances as will be discussed below.

Operational description

The operation of the invention will be described with reference to a military telephone system using such terminology as commander and subordinate to describe the conferees. However, the invention is not limited to military applications, nor is it limited to telephone systems, but is applicable to any switching system in which the mode of transmission is to be controlled.

Full duplex operation

Referring to FIGS. 1, 2, 3 and 4, the commander at station 200 wishing to establish a conference connection between station 200 and subordinate stations 115–2, 115–3, 115–4, 115–5 and 115–6, operates answer key 255 and thereby operates relay 220 which obtains a holding ground via release key 260 and contacts 220–1. Contacts 220–4 and 220–5 close the transmission path of lines L3 and L4 to line circuit 116–1 which is connected to the switching machine. Contacts 220–3 close ground to light lamp 221. Using his key set (not shown), the commander keys in a directory number which is assigned to this particular group of conferees. For each digit keyed, one of the contacts 211–1 to 211–4, one of the contacts 211–5 to 211–7 and contacts 211–8 are operated to generate a two-frequency tone burst for transmission over lines L3 and L4. Attention is invited to U.S. patent application of R. V. Burns et al., Ser. No 315,136, filed Oct 10, 1963, now Pat. No. 3,284,577, for a complete discussion of the calling device 201. It is only necessary in the present discussion to point out that contacts which connect circuit elements 203, 206, 209 and 210 select the frequency components for the tone burst and contacts which short out the tank circuits (i.e. 211–8) effect the generation of oscillations at the selected frequencies. The commander therefore keys the conference directory number into common control 110 via matrix 100 and with the aid of marker 105 makes connection and out-pulses the directory number to the outgoing trunk 125 which is assigned for conference calls. The functions and apparatus for seizing an outgoing trunk which are fully discussed in the above-mentioned Pat. No. 3,328,534, form no part of the present invention and need not be discussed in further detail herein.

The digits outpulsed to the outgoing trunk 125 are received by the MF receiver portion of a combination switch circuit 120. The register, translator and sender portions of circuit 120 decode these digits and determine sequences of digits to be outpulsed on trunks 126–2 to 126–6 in order to bring subordinate stations 115–2 to 115–6 into the conference connection. The incoming trunks are pulsed in sequence by the sender to establish connections through the matrix 100 to line equipment 116–2 to 116–6 under the control of common control 110 and marker 105.

Upon completion of the above sequence, a conference connection has been established between station 200 and stations 115–2 to 115–6 via line equipment 116–1, matrix 100, OGT trunk 125, bridge circuit 300, ICT trunks 126–2 to 126–6 and line equipment 116–2 to 116–6. This connection is illustrated in greater detail in FIGS. 2–6, and as shown therein, is normally conditioned for full duplex operation. This full duplex connection can easily be seen by tracing an input to the bridge circuit from any trunk circuit. For example, the output (R1–4, T1–4) of incoming trunk 126–4, is connected to the input resistances IR, except resistances 315–4, via contacts 306–10, 306–12 and leads 321T, 321R. Since each output of a trunk is coupled to the input of each portion of the bridge circuit, except its own corresponding input, the arrangement is full duplex.

Roll call

When the conference is established, the commander must know if all parties are present for consultation. A roll call by voice is possible with the commander having the ability to register each answering station manually at roll call circuit 285. However, a roll call of many stations in a conference could be a tedious chore by such method. Each subordinate station is equipped with a MF keyset *f2–f6* similar to that in station 200, and may signal his presence by operating an assigned code key or keys to send a MF signal to the roll call circuit 285 where his identity is automatically registered and displayed. As will be shown below, the roll call feature is also used for requesting permission to speak (a change in transmission mode) during the no-talk-back (NTB) mode of operation.

Talk back to console only (restricted duplex)

To operate in the restricted duplex mode, the commander momentarily operates broadcast key 275 which closes operating ground to relay 230 via contacts 220–2. Relay contacts 230–3 and 230–4 select two frequencies for transmission, and contacts 230–2 effect generation of those two frequencies. Contacts 230–1 extend operating ground to relay 235.

Contacts 235–2 extend operating ground via contacts 245–2 to relay 240; however, contacts 235–3 and 235–4 momentarily interrupt the possible frequency generating connections of relays 240 and 250 until relay 235 restores. Upon release of key 275, relay 230 restores, removing operating ground on relay 235 which restores, allowing transmission of a second two-frequency tone burst due to the closure of contacts 240–4, 240–5 and 240–6.

Before relay 240 restores, contacts 235–2 extends operating ground via contacts 240–2 and 250–1 to relay 245 which locks up on its contacts 245–1. Contacts 245–3 close to light lamp 246 indicating that the connection should be conditioned for restricted duplex operation.

As a result of the above operation, two tone bursts each comprising two frequencies are transmitted to the bridge circuit where they are detected by the MF receiver 301. The first tone burst causes relays 304 and 305 to operate for a timed interval and extend ground via contacts 305–1, contacts 304–1, diode 311 and contacts 306–2 to relay 307 which pulls its X contacts 307–1X and fully operates from ground in trunk 125 via contacts 306–3. Relays 304 and 305 restore at the end of the timed interval.

The second tone burst detected by receiver 301 causes relays 302 and 305 to operate and extend ground to relay 306 via contacts 305–1, contacts 302–1, diode 310 and contacts 307–2. Relay 306 pulls its X contacts 306–1X and operates fully from ground in trunk 125 via contacts 309–2. Relays 302 and 305 restore after the timed interval.

Relay 306 operates contacts 306–4 to 306–21 which connect the outputs of the incoming trunks 126 to the input of amplifier 314–1 by way of pad 318 and resistances 317–2 to 317–6. Resistances 316–1 to 316–6 serve to maintain the impedance level; for example, a 600-ohm office would require 600 ohm resistances to replace the outputs of the trunk circuits. Trunk 125 outputs R1–1, T1–1 are still serving each bridge input as before; however, trunk 125 inputs R2–1, T2–1 are serving all incoming trunks and the individual bridge inputs have been bypassed.

To return to full duplex operation, the commander again momentarily operates the key 275 and thereby operates relay 230. Relay 230 closes contacts 230–2, 230–3, and 230–4 to again generate the same two-frequency tone burst as before.

Contacts 230–1 close, causing relay 235 to operate and again open contacts 235–3 and 235–4 to momentarily prevent tone generation due to operation of relays 240 and 250. Contacts 235–2 supply operating ground to relay 250 via contacts 245–2 (already operated). When the broadcast key 275 is released, relay 230 restores and relay 235 restores. Contacts 250–3, 250–4, and 250–5 cause a second two frequency tone burst to be generated. Relay 250 restores. Lamp 246 is extinguished when contacts 245–3 open indicating that the arrangement has been conditioned for full duplex operation.

The MF receiver 301 detects the individual frequency components of the first tone burst and operates relays 304 and 305 for a time interval. Ground is supplied to relay 308 via contacts 305–1, 304–1 and 306–2. Relay 308 operates X contacts 308–1X which supply an operating ground thereto via contacts 309–3 and the outgoing trunk 125. Relays 304 and 305 release.

The second tone burst is detected by receiver 301 and relays 303 and 305 are operated for a time interval to supply ground via contacts 305–1, contacts 303–1, diode 312 and contacts 308–2 to relay 309 which operates its X contacts 309–1X ad operates fully on the ground from trunk 125 via contacts 308–3 and 309–1X.

Contacts 309–2 and 309–3 open the holding ground to restore relays 306 and 308. Contacts 306–3 and 308–3 open the holding grounds to restore relays 307 and 309. Contacts 306–4 to 306–21 open to condition the bridge for full duplex operation. Relay 303 and relay 305 restore at the end of the timed interval.

No talk back (NTB) mode of operation

Transfer to the NTB mode may be made from either the restricted duplex or the full duplex modes.

When transfer from the restricted duplex to the NTB mode is desired, the commander operates key 265 closing operating ground to relay 225. Relay 225 operates and locks via contacts 220–2, key 270, and contacts 225–1. Contacts 225–6 place a resistive bridge 281 across the input to the talking circuit 213, and contacts 225–5 and 225–4 disconnect the talking circuit and bridge resistance 280 and roll call circuit 285 across the receiving path L1 and L2. Contacts 225–2 operate to light lamp 226 indicating that the console has been conditioned to the NTB mode. The bridge, however, is still in the restricted duplex mode.

To return to restricted duplex operation, talk back key 270 is operated to remove holding ground from relay 225 which restores, removes the roll call circuit from the receive path, and reconnects the receive path to the talking circuit. Contacts 225–2 open and lamp 226 is extinguished.

In transferring from full duplex operation, key 265 is operated, relay 225 operates as just described and contacts 225–3 extend operating ground via contacts 240–1 and 245–4 to operate relay 230. Relays 230, 235, 240, 245, and 250 operate as previously described for the restricted duplex mode with the exception that contacts 240–1 function to release relay 230 as did key 275 in the previous discussion.

To return to full duplex operation, key 275 is operated to transmit the second set of tone bursts for restoring the normal bridge connections and key 270 is operated to restore the receiving path of station 200.

Voice roll call cannot be made in the NTB mode. Therefore, a roll call may be made upon request of the commander by each conferee keying in an identifying code which will be recognized and registered in the roll call circuit 285. As previously mentioned, the roll call circuit feature may also be utilized by a subordinate conferee who is requesting to transmit. In such a case, the conferee would key in an identifying digit or digits to the roll call circuit 285 which would register his request to change the mode of operation.

At the end of conference, the commander operates release key 260 to remove the holding ground from relay 220 which restores. Contacts 220–4 and 220–5 remove the transmit pair from the connection; contacts 220–2 remove the ground supply to the control relays; and contacts 220–3 extinguish lamp 221.

While the invention has been illustrated by a specific non-limited example, it is to be understood that the invention may be modified to take many forms and be incorporated in various communication systems as well be evident to those skilled in the art. For example, stations 200 and 115–2 to 115–6 are not limited to telephone type apparatus but may be any type of apparatus which transmit and receive information by way of a bridge circuit and which are adapted to transmit and receive control signals. Changes and modifications other than that just suggested will be evident to those skilled in the art without departing from the spirit and scope of the invention and should be included in the appended claim.

What is claimed is:

1. In a communication system, a control station and a plurality of subordinate stations, a conference bridge circuit comprising a plurality of four-conductor terminals each comprising a two-conductor voice input path and a two-conductor voice output path, one of said terminals being a main terminal and the others being subordinate terminals, a main amplifier including a two-conductor voice input and a two-conductor voice output, subordinate amplifying means having voice input means and voice output means, means including resistance connecting the input path of the main terminal to the input means of the subordinate amplifying means, means connecting the output means of the subordinate amplifying means to the output paths of all of the subordinate terminals, a full duplex mode circuit in which the input paths of all of the subordinate terminals are connected via resistance means to the input of the main amplifier and also to the input means of the subordinate amplifying means, a restricted duplex mode circuit in which the input paths of all of the subordinate terminals are connected via resistance means to the input of the main amplifier only, a switching network having terminations connected via individual lines to each of said stations, and having other terminations connected via trunk circuits to said terminals of the conference bridge circuit, with means providing separate two-conductor lines to said voice input paths and output paths thereof;

means to selectively operate the switching network to connect the control station termination to the main terminal termination, and to individually connect subordinate station terminations to subordinate terminal terminations, whereby the voice input paths and output paths of the bridge terminals are extended through the network and said individual lines to the corresponding stations;

said conference bridge circuit further comprising mode changing apparatus including a signal receiver and switching means connected thereto; the signal receiver having an input connected to said voice input path of the main terminal, said switching means having switching points in the connections from the voice input paths of the subordinate terminals to the input of the main amplifier and said signal receiver being operated responsive to selective signals received by said receiver over said voice input path of the main terminal to cause said switching means to set up via said switching points either the full duplex mode circuit or the restricted duplex mode circuit, and said control station including control signal transmitting means selectively operative during a conference to transmit predetermined control signals via its said line and the switching network to the voice input path of said main terminal and thence to said signal receiver of the mode changing apparatus to remotely and automatically control said apparatus from the control station.

References Cited

UNITED STATES PATENTS

| | | | |
|---|---|---|---|
| 2,403,475 | 7/1946 | Bascom et al. | 179—90 |
| 3,099,719 | 7/1963 | Gerbore et al. | 179—18 |
| 3,284,577 | 11/1966 | Burns et al. | 179—90 |
| 3,301,962 | 1/1967 | McKelvey et al. | 179—18 |
| 3,384,717 | 5/1968 | Coston | 179—18 |
| 3,423,532 | 1/1969 | Coel et al. | 179—18 |

KATHLEEN H. CLAFFY, Primary Examiner

A. B. KIMBAU, Jr., Assistant Examiner

U.S. Cl. X.R.

179—1